United States Patent
Randall

[11] 3,910,331
[45] Oct. 7, 1975

[54] NUT

[75] Inventor: Robert H. Randall, Fullerton, Calif.

[73] Assignee: Kaynar Mfg. Co., Inc., Fullerton, Calif.

[22] Filed: Aug. 12, 1974

[21] Appl. No.: 496,726

[52] U.S. Cl. .......................... 151/41.72; 151/41.73
[51] Int. Cl.² ........................................ F16B 37/00
[58] Field of Search............. 151/41.7, 41.72, 41.73, 151/37

[56]         References Cited
        UNITED STATES PATENTS

| | | | |
|---|---|---|---|
| 1,443,003 | 1/1923 | Cassel | 151/37 |
| 2,026,757 | 1/1936 | Swanstrom | 151/41.72 |
| 2,432,257 | 12/1947 | Stetzer | 151/41.73 |
| 2,707,507 | 5/1955 | Tripp et al. | 151/41.7 |
| 2,709,469 | 5/1955 | Tripp et al. | 151/41.7 |
| 3,117,611 | 1/1964 | Matthews | 151/41.73 |
| 3,687,501 | 8/1972 | Wilson | 151/41.73 |

FOREIGN PATENTS OR APPLICATIONS 370,948   4/1932   United Kingdom.............. 151/41.72

*Primary Examiner*—Edward C. Allen
*Attorney, Agent, or Firm*—Harness, Dickey & Pierce

[57]        ABSTRACT

A nut having a flange containing rounded projections on one face adapted to be pressed into the surface of an object which is to be secured by the nut and with a hollow expansible shank projecting in the same direction as the flange concentric with respect to the threaded opening in the nut and having a scalloped surface, the irregularities of which are also of smoothly rounded form. The shank is pressed into an opening in the work and the projections displace material, some of which enters the scalloped shank area.

3 Claims, 4 Drawing Figures

NUT

BACKGROUND OF THE INVENTION

Flanged nuts have been employed in the past having various types of means for securing them against rotation, including rivet holes and teeth or other projections adapted to bite into the work. For some purposes such nuts have been less than satisfactory because of the tendency of the projections and/or riveted areas to cause stress concentrations which shorten the fatigue life of the fastened material. The overall object of the present invention is to provide an improved press-in type nut incorporating simple and inexpensive but effective means for preventing rotation of the nut during application of the bolt and which can be used in highly loaded structural applications without causing objectionable stress concentrations. A related object is to provide such a nut which is low in cost and adapted for rapid installation.

Other objects and advantages of the present invention will become apparent upon consideration of the present disclosure in its entirety.

BRIEF DESCRIPTION OF THE FIGURES OF DRAWING

DETAILED DESCRIPTION OF PREFERRED FORM OF THE INVENTION

Figure 1:
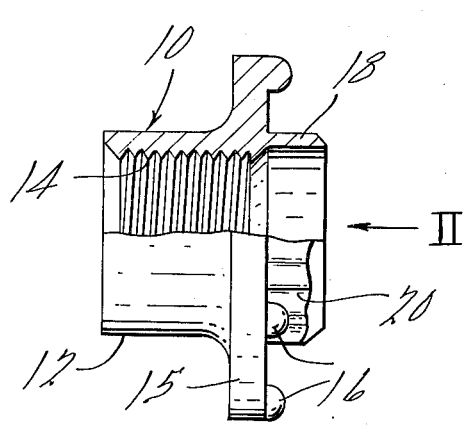
FIG. 1 is a view partly in side elevation and partly in section of a press-type nut embodying the present invention.

Reference character 10 designates generally the body of the improved press-on nut, which is shown as of the swagable type. The body of the nut includes a collar-like shank portion 12 which is of conventional character and provided in the usual manner with internal threads 14. To provide a locking effect the threaded area may be distorted, as is well known. Because of such distortion the torque transmitted to the nut during installation of the bolt is substantial, making it desirable to provide rotation-inhibiting means. Various types of such inhibiting means have been used heretofore, as noted above.

Figure 2:
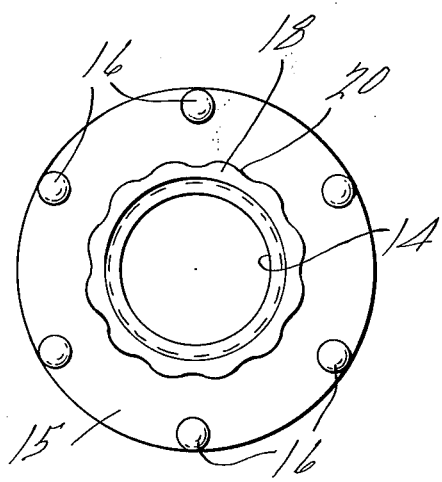
FIG. 2 is an end elevational view thereof taken as indicated by the arrow II in FIG. 1.

At the base of the threaded shank portion 12 the body carries a flat flange 15 projecting perpendicularly to the axis and carrying near its periphery and on its side opposite the threaded shank 12 a plurality of hemispherical projections 16. On the same side as the projections 16 an integral hollow cylindrical collar 18 is provided which is concentric with the axis and of an internal diameter slightly greater than the major diameter of the threads 14. The outer surface of the collar 18 is provided with radially and axially extending irregularities 20 which, as best shown in FIG. 2, are of smoothly curved sinuous form when viewed in the axial projection.

Figure 3:
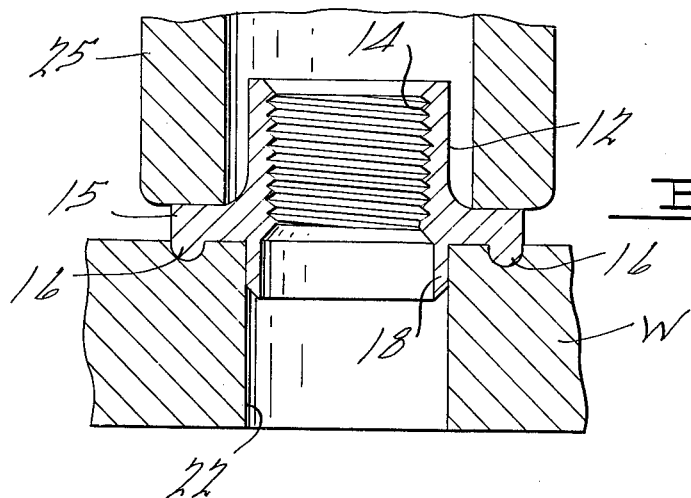
FIG. 3 is a view partly in section and partly in side elevation illustrating the method of applying the nut to the work.
Figure 4:
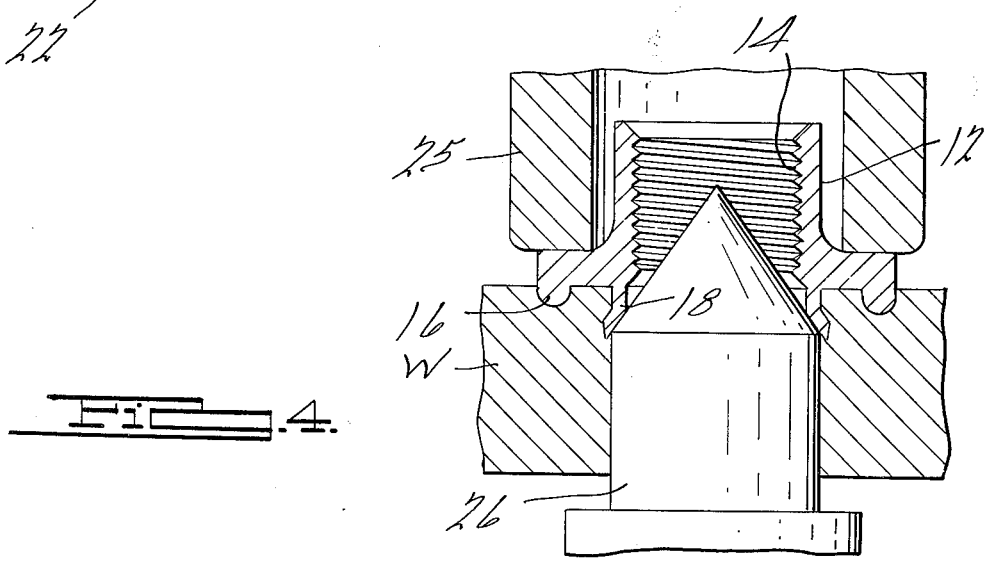
FIG. 4 is a view similar to FIG. 3 showing the swaging operation for securing the nut to the work.

As best shown in FIG. 3, the nut is installed by inserting the collar portion 18 in an aperture 22 in the workpiece W, the aperture conforming closely in size to the maximum diameter of the sinuous projections 20. By means of a suitable dolly 25 the flange is pressed against the work with sufficient force to drive the projections 16 into the surface. Thereafter, as shown in FIG. 4, the collar 18 is expanded by means of a suitable punch 26, while the dolly 25 remains in position as a backing, to flare the collar and retail the nut in position.

Due to the spherical contour of the projections 16 the material of the workpiece is displaced in a fashion and to a contour which avoids sharp corners and resultant areas of stress concentration. Some of the displaced material moves radially into the root areas of the radially extending sinuous projections 20, such displaced material also being thereby contoured to smoothly rounded form. The nut is thus effectively keyed against rotation by the interengagement of the knobs 16 and the projections 20 with the work.

In a successful embodiment of the invention the nut is manufactured of heat treated carbon or alloy steel and is coated with a molybdenum disulfide dry lubricant. Suitable proportions are indicated by the following dimensions of a nut having thread diameter of 0.1900 inch constructed as shown. The maximum diameter of flange 15 of such nuts is 0.370 inch. The scalloped collar 18 has a maximum diameter of 0.247 inch and minimum diameter of 0.237 inch. The hemispherical projections 16 have a radius of from 0.032 to 0.042 inch. Tests of these nuts installed in clad aluminum sheet 0.060 inch thick showed an ability to withstand from 90 to 95 inch pounds of torque before displacement occurred.

Tests of press-on nuts constructed in accordance with the present disclosure in comparison with riveted types have shown resistance to fatigue failures of a much higher order than has heretofore been achieved.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. A nut or the like adapted to be clinched to a workpiece, said nut having a flange lying in a plane substantially perpendicular to its axis and a plurality of projections on one face of the flange, said projections extending in an axial direction, characterized by workpiece-engaging portions all of which are smoothly contoured, including integral projections having generally spheroidal ends formed of relatively hard material whereby deformation of a workpiece by said projections does not create sharp angles in the surface of the workpiece, a swagable securing collar extending axially from the flange in the same direction as the projections and coaxially with the nut, said collar having radially directed recesses in its outer surface facing said projections and having smoothly rounded surfaces, the radially outer portions of said recesses being smoothly flared, whereby material displaced by the projections may flow into the recesses without being shaped to sharply angled contours.

2. A nut as defined in claim 1 wherein said radially directed recesses extend axially of the surface of said collar and said collar is relatively thin in a radial direction and adapted to be expanded to secure the nut with respect to the work.

3. A nut as defined in claim 2 wherein each projection is radially aligned with one of the recesses.

* * * * *